United States Patent
Karoubalis et al.

(10) Patent No.: US 7,471,656 B2
(45) Date of Patent: Dec. 30, 2008

(54) METHOD AND SYSTEM FOR SEAMLESS MOBILITY OF MOBILE TERMINALS IN A WIRELESS NETWORK

(75) Inventors: Theodore Karoubalis, Athens (GR); Ioanna Samprakoy, Athens (GR)

(73) Assignee: Atmel Corporation, San Jose, CA (US)

( * ) Notice: Subject to any disclaimer, the term of this patent is extended or adjusted under 35 U.S.C. 154(b) by 1151 days.

(21) Appl. No.: 10/685,727

(22) Filed: Oct. 14, 2003

(65) Prior Publication Data
US 2005/0018637 A1   Jan. 27, 2005

(30) Foreign Application Priority Data
Jul. 8, 2003   (GR) ............................... 030100293

(51) Int. Cl.
*H04Q 7/00* (2006.01)
(52) U.S. Cl. ........................... 370/331; 370/338
(58) Field of Classification Search ............. 370/331, 370/332, 395.52, 395.53, 395.54, 908; 455/436, 455/437, 438, 439, 440
See application file for complete search history.

(56) References Cited

U.S. PATENT DOCUMENTS

| | | | |
|---|---|---|---|
| 6,711,147 B1 * | 3/2004 | Barnes et al. | 370/338 |
| 6,768,726 B2 * | 7/2004 | Dorenbosch et al. | 370/331 |
| 6,987,985 B2 * | 1/2006 | Purkayastha et al. | 455/552.1 |
| 7,058,059 B1 * | 6/2006 | Henry et al. | 370/395.1 |
| 7,089,006 B2 * | 8/2006 | Idnani et al. | 455/436 |
| 7,149,524 B2 * | 12/2006 | Reynolds | 455/437 |

FOREIGN PATENT DOCUMENTS

WO   WO 03/065682 A1 *   1/2003

* cited by examiner

*Primary Examiner*—Quochien B Vuong
(74) *Attorney, Agent, or Firm*—Schwegman, Lundberg & Woessner P.A.; Gregory J. Gorrie (57) ABSTRACT

Aspects for seamless mobility of mobile terminals in a wireless network are described. The aspects include utilizing a reassociation request from a mobile terminal to identify need for an internetwork handover of the mobile terminal roaming in a wireless local area network (WLAN), and performing a protocol sequence in an access point (AP) for the mobile terminal to handle the internetwork handover to ensure connectivity of the mobile terminal while roaming.

18 Claims, 10 Drawing Sheets

| IAPP Version | Command | Identifier | Length | Data |
|---|---|---|---|---|

FIG. 5B (PRIOR ART)

| Address Length | Reserved | MAC Address | Sequence Number | Length of Context Block | Context Block |
|---|---|---|---|---|---|

FIG. 5C

| Address Length | Reserved | MAC Address | Sequence Number | HAIP | MNIP |
|---|---|---|---|---|---|

FIG. 5D

| Address Length | Reserved | MAC Address | Sequence Number | REIP | MNIP |
|---|---|---|---|---|---|

```
                              New AP role
If (receipt of Reassociation.Request) {
    Identify handover case
        If (L3_handover && HAP_IP=PAP_IP) {                  /* inter-network movement */
            Insert STA in VisitorList
            Add STA ARP entry                                /* FA decapsulation */
            Establish tunnel towards HAP
            Add STA forwarding entry via NAP-HAP tunnel      /* FA encapsulation */
                            for packets with SA=STA IP
            Send Roam-request to HAP
            Send IAPP L2 update to the subnet broadcast address
        }
        If (L3_handover && HAP_IP!=PAP_IP) {                 /* inter/intra-foreign network
movement */
            (optional - RADIUS)
            RADIUS protocol usage        /* Access-Request/Access-Accept RADIUS messages [7]
   */
            Insert STA in VisitorList
            Add STA ARP entry                                /* FA decapsulation */
            Establish temporary tunnel towards PAP
            Establish bi-directional tunnel towards HAP
            Add STA forwarding entry via NAP-HAP tunnel      /* FA encapsulation */
                            for packets with SA=STA IP
            Set timer for deletion of the NAP-PAP tunnel
            Send Roam-request to HAP
            Send Create-Tunnel-request to the PAP ("Remote IP" address=NAP IP address)
        }
}

If (receipt of Roam-response) {
    Check 'Status' field
    If ('Status' !=SUCCESS) {
        Delete all STA routing entries
        Delete the HAP-NAP tunnel established for STA
    }
    Else {Start routing STA's packets}
}

If (receipt of Create-Tunnel-response) {
    Check 'Status' field
    If ('Status' !=SUCCESS) {
        Delete all STA routing entries concerning this tunnel
        Delete the PAP-NAP tunnel established for STA
    }
    Else {Start routing STA's packets}
}
```

FIG. 6A

```
                           Home AP role
If (receipt of Roam-Request) {
   Search RoamingList
      If (STA not in RoamingList)          /* inter-network movement */
         { Insert STA in RoamingList }
      Else if (STA in RoamingList)         /* inter/intra-foreign network movement */
         { Update NAP's IP for this STA entry }  /* change RE_IP of previous tunnel */
      Establish tunnel towards NAP         /* RE=NAP for the new tunnel */
      Add STA forwarding entry via HAP-NAP tunnel for packets with DA=STA IP
                                           /* HAP encapsulation */
   If (successful tunnel establishment) {
      If (inter-network movement)
         { Send Roam-response to NAP ('Status' = SUCCESSFUL) }
      Else {
         Send a Roam-response to NAP ('Status' = FAILURE)
         Delete all previous STA routing entries
         Delete the HAP-NAP tunnel established for STA
      }
   }
}
```

FIG. 6B

```
                           Previous AP role
If (receipt of Create-Tunnel-request) {
   Search the VisitorList
      If (STA in VisitorList) {Remove this STA entry}       /* stale entry */
   Establish temporary tunnel towards NAP
   Add STA forwarding entry via PAP-NAP tunnel for packets with DA=STA IP coming
   through HAP-PAP tunnel               /* Temporary recovery of ongoing sessions */
   Set timer for deletion of the NAP-PAP tunnel
   If (successful tunnel establishment) {
         Send Create-Tunnel-response to NAP ('Status' = SUCCESSFUL) }
         Delete all STA previous routing entries concerning the HAP-PAP tunnel
         Delete the HAP-PAP tunnel established for this STA
   }
}
```

METHOD AND SYSTEM FOR SEAMLESS MOBILITY OF MOBILE TERMINALS IN A WIRELESS NETWORK

FIELD OF THE INVENTION

The present invention relates to roaming by mobile terminals in wireless networks, and more particularly, to support of L3 handovers for seamless mobility during the roaming in the wireless networks.

BACKGROUND OF THE INVENTION

Wireless communication has seen tremendous growth in recent years and is becoming widely applied to personal and business computing. Wireless access is broadening network reach by providing convenient and inexpensive access in hard-to-wire locations. Of major benefit is the increased mobility wireless local area networks (WLANs) allow. Wireless LAN users can roam seemingly without restriction and with access from nearly anywhere without being bounded by conventional wired network connections.

One of the most significant issues in the area of wireless and mobile communications technology is the provision of constant IP (Internet protocol)-connectivity to mobile nodes upon roaming. While the IEEE 802.11 standard for WLANs acts as an important milestone in the evolution of wireless networking technology, roaming has not yet gained much coverage in the current IEEE 802.11 standard, resulting in insufficient support of key mobility functions.

Figure 1:
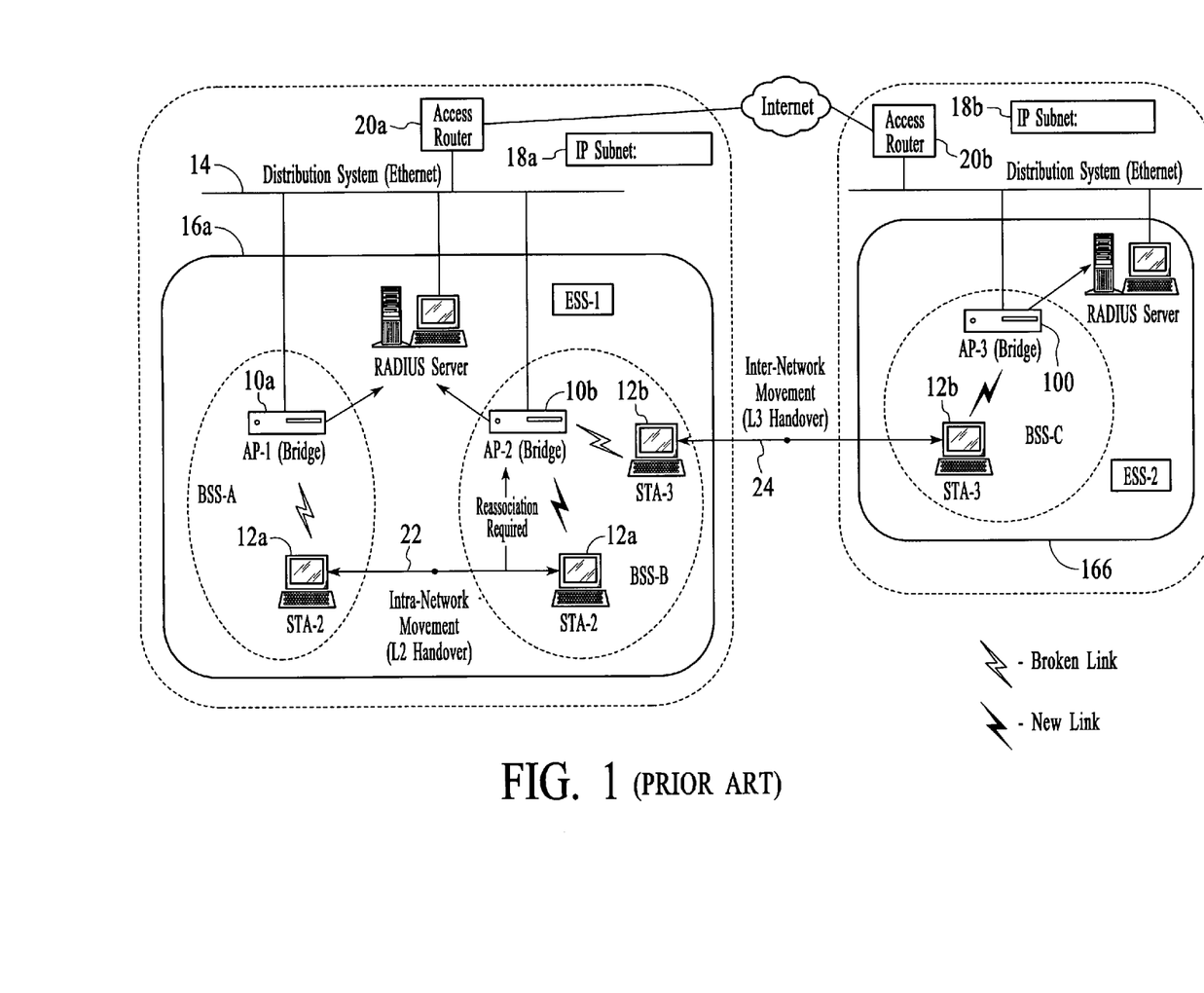
FIG. 1 illustrates a wireless network system in accordance with the prior art.
Figure 2:
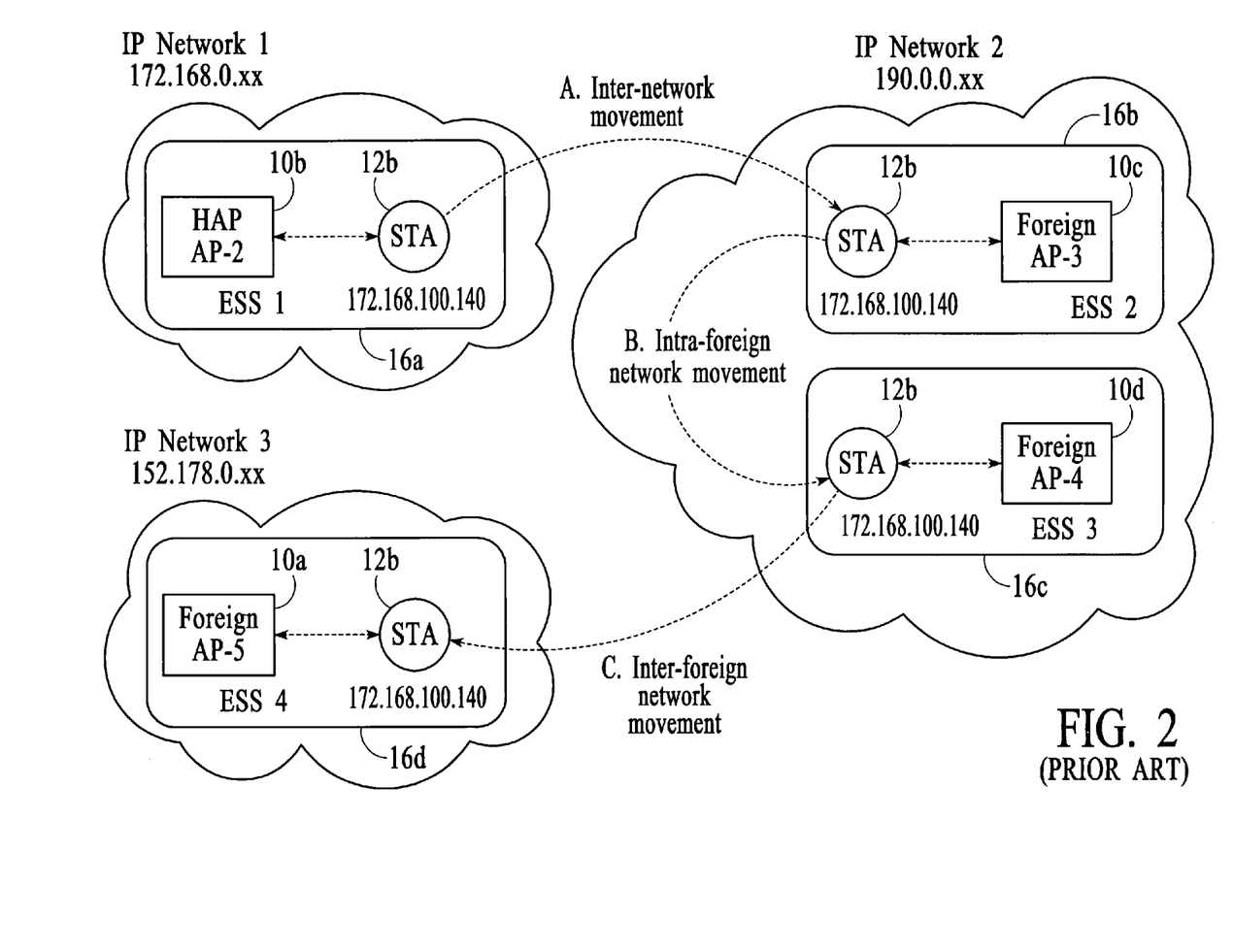
FIG. 2 illustrates inter-network movements in the wireless network of FIG. 1.

Referring concurrently to FIGS. 1 and 2, a typical IEEE 802.11 infrastructure WLAN environment consists of access points 10a, 10b, 10c, 10d, 10e (APs) and mobile terminals/stations 12a, 12b (STAs) communicating over the air via 802.11b specific messages. Neighboring APs are attached to a wired distribution system 14 (DS) and form an extended service set 16a, 16b, 16c, 16d (ESS). Upon power up, a STA 12a gets associated to an AP 10a inside the ESS 16a within which it is residing via specific association messages. At the same time, it obtains an IP address (e.g., via DHCP, Dynamic Host Configuration Protocol) so as to be widely reachable at its current location. Furthermore, certain authentication procedures take place (e.g., 802.1x authentication) in order to authenticate the STA 12a. The IP subnet 18a where the STA's IP address belongs is called the home network (HN). Every time the STA 12a powers up inside an ESS 16a, the IAPP (Inter-Access Point Protocol) is triggered so as to inform the neighboring APs 10b about the STA's 12a physical location. This is accomplished via specific layer 2 (L2) message updates sent by the home access point (HAP) 10a to the subnet broadcast address. Routing of the IP datagrams is performed via standard IP routing mechanisms. The APs 10a, 10b are used as L2 bridges. Any packets sourcing outside the HN and destined to the STA 12a, arrive at the gateway router 20a of the corresponding ESS 16a. Inside the ESS 16a, specific L2 bridging takes place to successfully deliver packets to the STA's actual location.

Within the ESS 16a, the STAs 12a, 12b may roam from one AP (e.g., 10a) to another AP (e.g., 10b) via reassociation messages. In an 802.11 WLAN, each time a STA 12a is reassociating to a new AP 10b inside the ESS 16a of its HN, it performs an intra-network handover. The L2 point of attachment has changed to the MAC address of the new AP 10b, and the new AP 10b becomes the STA's HAP (home AP). The STA 12a preserves its MAC address. The time elapsed between the cut-off of the previous AP-STA and the connection running between the new AP and the STA is called the handover period or handover recovery time. During this period, any active sessions that this STA 12a had before its movement get disconnected. The L2 handover of 802.11 STAs is supported by the IAPP protocol, which provides the necessary means for quick recovery of the interrupted active sessions. Moreover, it assures that the STA is still able to send/receive IP packets from its new location while preserving its home IP address.

For inter-network handover in IEEE 802.11 WLANs, the STA 10a moves inside an ESS 16b that belongs to a different IP subnet, i.e., it triggers a layer 3 (L3) handover. This type of handover is performed when a roaming STA 12a reassociates to a foreign AP 10c of an ESS 16b outside of its home network and involves both an L2 and an L3 handoff. (Similarly, if a STA already lying in a foreign network roams inside/between foreign networks, it still performs an L3 handover.) Thus, via specific 802.11 MAC layer mechanisms, the STA 12a is now physically attached to a foreign AP 10c. However, it was not one of the IAPP objectives to provide support for inter-network (L3 or IP) handover of 802.11 roaming STAs. Accordingly, any packets now destined to the home address of the STA 12a are routed to its HN. However, these packets will be dropped due to the fact that the STA 12a does not physically belong there anymore. Similarly, any packets originated from the STA 12a will be dropped inside the foreign network, because their source IP address does not belong to this subnet.

All of these routing issues arising upon an L3 handover form a problem that is outside the scope of the IAPP. With the increasing deployment of 802.11 networks in both commercial and home environments, the need for inter-network handover increases. The present invention addresses this need, ensuring constant IP-connectivity during any type of handover (IP or MAC layer) to assist in unbounded roaming of 802.11 STAs.

SUMMARY OF THE INVENTION

Aspects for seamless mobility of mobile terminals in a wireless network are described. The aspects include utilizing a reassociation request from a mobile terminal to identify need for an internetwork handover of the mobile terminal roaming in a wireless local area network (WLAN), and performing a protocol sequence in an access point (AP) for the mobile terminal to handle the internetwork handover to ensure connectivity of the mobile terminal while roaming.

Through the present invention, the IP-flows of roaming mobile terminals are preserved even when the mobile terminals move across different sub-networks. Further, the protocol sequence of the present invention requires no changes in the protocol stack of the 802.11 mobile terminals, and the handover is supported in a way that is transparent to the mobile terminals. In addition, real-time and critical sessions are maintained with quick restoration of IP-connectivity via low-loss and low-latency handover that integrates to the existing IEEE 802.11 standard, instead of requiring the additional use of separate handover protocols, such as Mobile IP. These and other advantages will become readily apparent from the following detailed description and accompanying drawings.

BRIEF DESCRIPTION OF THE DRAWINGS

FIG. 5b illustrates a data field for the packet of FIG. 5a.

DETAILED DESCRIPTION

The present invention relates to seamless mobility support for mobile terminals in a wireless network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 3:
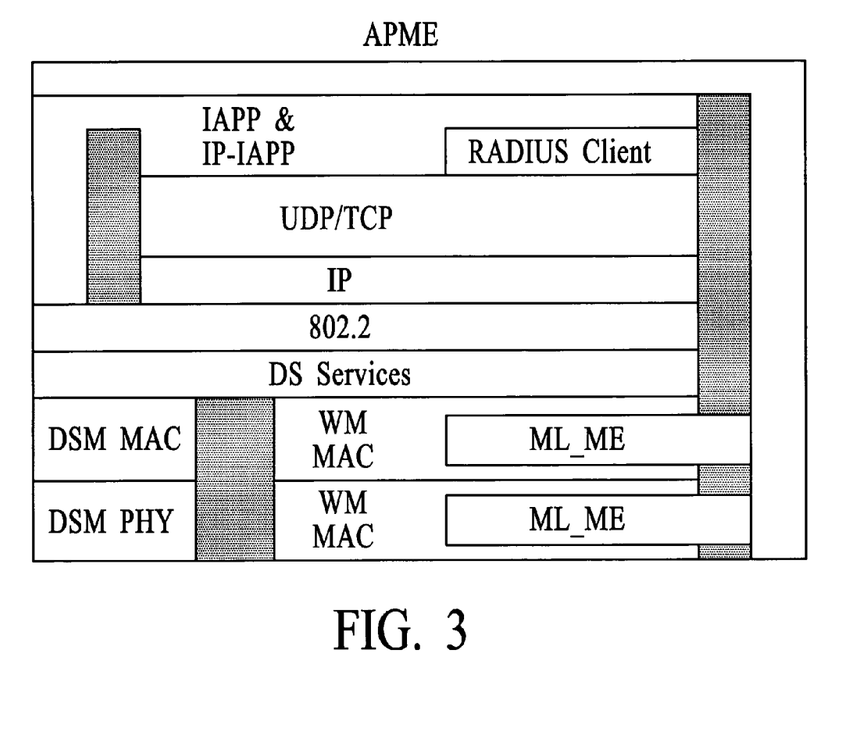
FIG. 3 illustrates a protocol stack in accordance with the present invention.

In general, the present invention extends IAPP functionality rather than replacing it and is added in the existing protocol stack of IEEE 802.11 APs, as indicated by the Radius client layer in the protocol stack illustrated in FIG. 3 . Further, the aspects of the protocol sequence of the present invention are utilized only if an L3 handover is identified by an AP upon receipt of an IEEE 802.11 Reassociation.Request message by a STA. If no L3 handover is identified, standard IAPP takes place to handle the L2 handover. An L3 handover identification preferably occurs based on IP specific information which is retrieved by the 802.11 Reassociation.Request frame, which is extended in accordance with the present invention to include three new fields that are the only changes required by the STAs for the aspects of the present invention to be applicable to 802.11 L3 handovers. The fields are: (1) HAP IP address; (2) STA IP address; and (3) Previous AP (PAP) IP address.

Figure 4A:
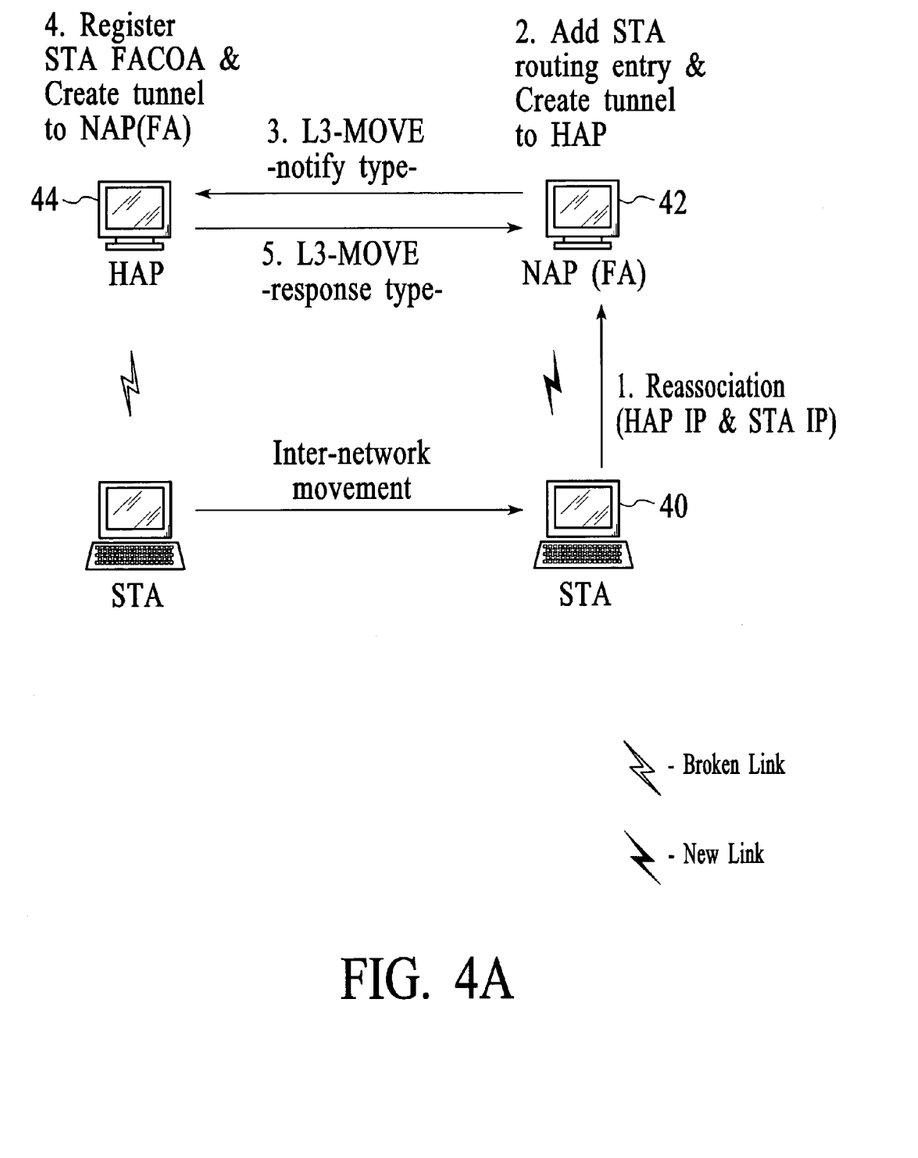
FIGS. 4a and 4b illustrate a method supporting handover movements in accordance with the present invention.
Figure 4B:
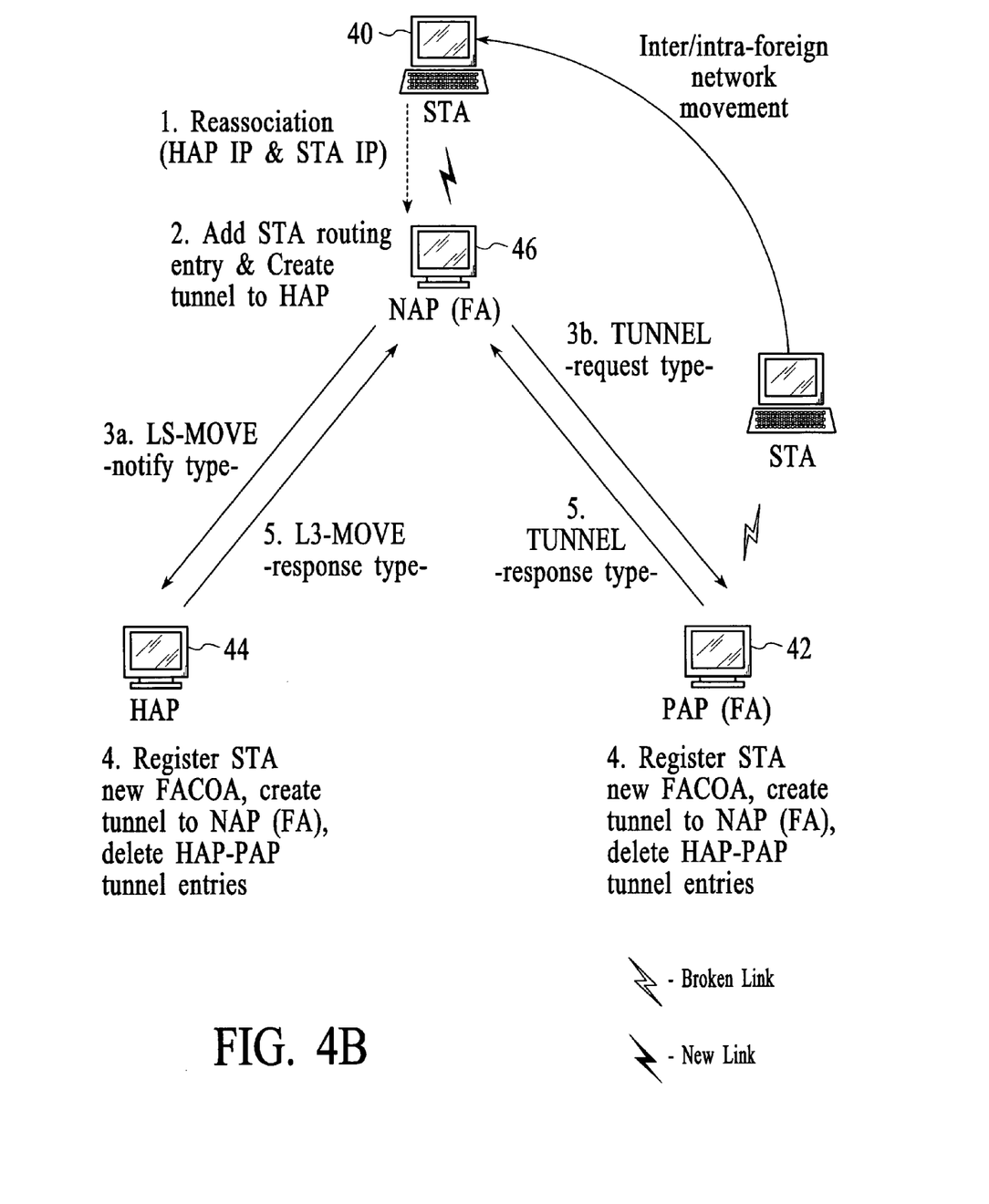

Referring now to FIGS. 4a and 4b, in accordance with the present invention, the sequence of actions during L3 handover during inter-network movement and inter/intra-foreign-network movement, respectively, are shown. For inter-network movement, the sequence initiates upon receipt of a reassociation request from a STA 40 to a NAP 42. The NAP 42 adds a routing entry for the STA 40 and creates a tunnel to the HAP 44. The NAP 42 further sends an L3-MOVE-notify-type packet to the HAP 44. The HAP 44 in turn registers the FACOA (foreign agent care of address) for the STA and creates a tunnel to the NAP 42. The HAP 44 then sends an L3-MOVE-response-type packet to the NAP 42. In the inter/intra-foreign network movement, the NAP 46 performs the same sequence with the HAP 44. However, the sequence also includes a TUNNEL request being sent from the NAP 46 to the PAP 42 when the L3-MOVE-notify-type packet is sent to the HAP 44. In response, the PAP 42 registers the STA new FACOA, creates a tunnel to NAP 46, and deletes the HAP-PAP tunnel entries. The PAP 42 then sends a TUNNEL response to the NAP 46.

Figure 5A:
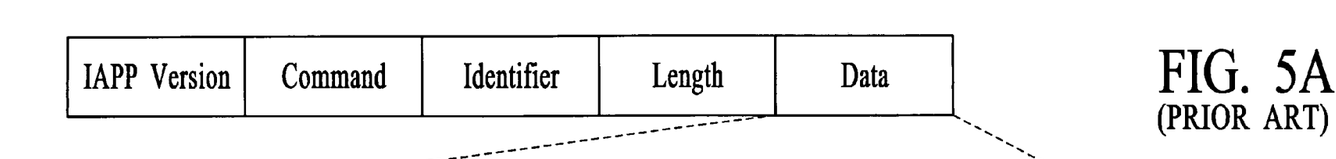
FIG. 5a illustrates a general 802.11f IAPP packet of the prior art.
Figure 5B:
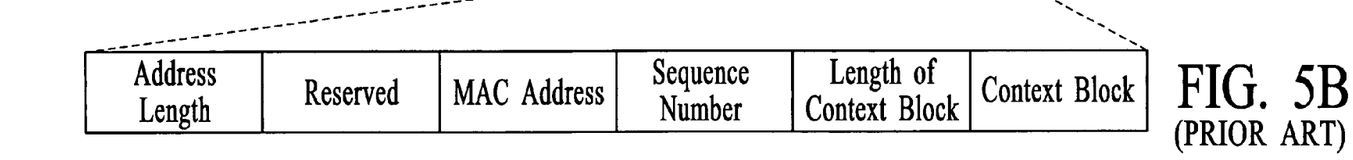

While MOVE-notify- and -response-type packets are presented with reference to FIGS. 4a and 4b, these packet types, as defined in IEEE 802.11f D3.1, are modified in accordance with the present invention. FIG. 5a illustrates a standard format for these packet types, while FIG. 5b illustrates a standard format for the data field of these packet types. These packets types are modified to provide new IAPP-based packets (TCP/IP and UDP/IP packets) in accordance with the present invention for exchange between the involved parties of a STA's L3 handover. These new packets are Roam-request, Roam-response, Create-Tunnel-request, and Create-Tunnel-response. Along with the new packets, new service primitives are generated at the corresponding APs and are analogous to standard IAPP service primitives. These new service primitives are the Roam.Request primitive, Roam.Response primitive, Create-Tunnel.Request primitive, and Create-Tunnel.Response primitive.

Figure 5C:
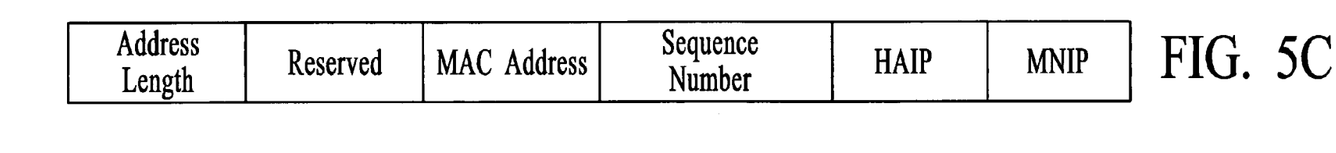
FIGS. 5c and 5d illustrate data fields for the packet of FIG. 5a in accordance with the present invention.

A Roam.request primitive is generated at a NAP only in the case of a STA's network handover when the NAP receives an MLME-Reassociate.indication. The NAP then sends a Roam-request packet to the HAP and an L2 update frame to the subnet broadcast address, which may be useful in situations where the APs support dynamic routing. The Roam-request packet, a TCP/IP packet, causes registration of the FACOA to the HAP and triggers HAP-NAP tunnel establishment. The Roam-request packet is the same as the IAPP Move-notify request packet with an extension to also carry the HAP and STA IP addresses. Since the command values of 0-4 are reserved by the 802.11f IAPP packets, a command value of 5 is suitable for the packet generated, and a preferred data field for the packet is illustrated in FIG. 5c.

Upon receipt of a Roam-request packet from the NAP of a STA, the Roam.response primitive is generated at the HAP. The HAP then sends a Roam-response packet to the NAP indicating the successful creation of the HA-NAP tunnel at the HAP. The Roam-response packet, a TCP/IP packet, is the same as the IAPP Move-response packet with an extension to also carry the HAP and STA IP addresses. For the packet fields, the status field suitably indicates success or failure of the tunnel creation, while the command field has a distinctive command value, e.g., 6, and the data field is structured as illustrated in FIG. 5c.

The Create-Tunnel.request primitive is generated at an AP acting as a NAP for a STA in cases of intra/inter-foreign-network movements and causes the sending of a Create-Tunnel-request packet to the PAP of the STA. The Create-Tunnel-request packet, a UDP/IP packet exchanged from the NAP to the PAP, informs the PAP of the new FACOA and triggers NAP-PAP temporary tunnel establishment. The Create-Tunnel-request packet is the same as the IAPP MOVE-notify packet with an extension to also carry the STA IP address. For the packet, the command field has a suggested value of 7. The remote end AP of the tunnel to be created (i.e., RE=NAP) is indicated in the REIP field, and the STA is specified in the MAC address and MNIP fields, as illustrated in the data field of FIG. 5d.

Figure 5D:
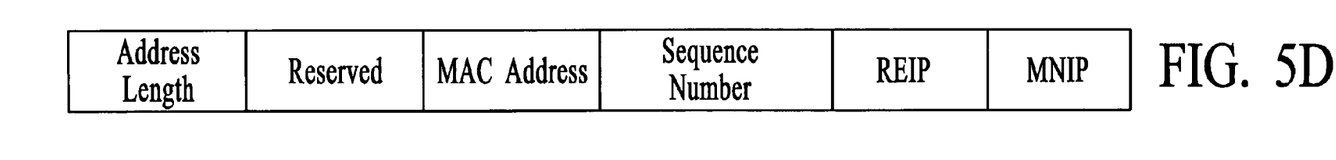

In cases of intra/inter-foreign-network movements, the Create-Tunnel.response primitive is generated at the PAP of a STA and causes the PAP to send a Create-Tunnel-response packet to the NAP of the STA. The Create-Tunnel-response packet, a UDP/IP packet, indicates completion of the PAP's actions for the PAP-NAP tunnel establishment to the NAP. The Create-Tunnel-response packet is the same as the IAPP Move-response packet with an extension to also carry the STA IP address. Thus, the packet's data field is the same as that of the Create-Tunnel-request with the reserved field replaced by a status field having a success or failure value. A value of 8 is suggested for the command value.

Figure 6A:
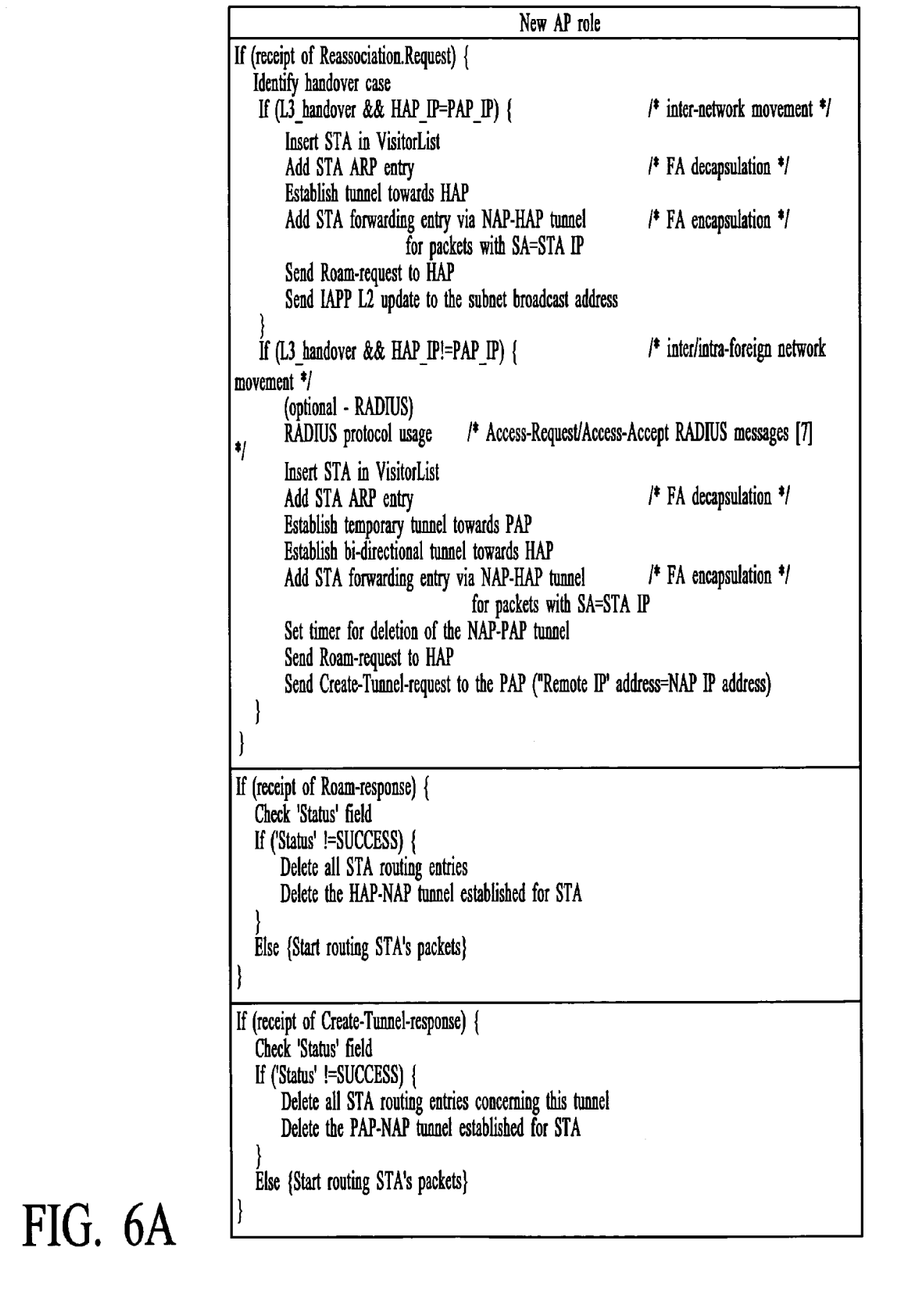
FIGS. 6a, 6b, and 6c illustrate pseudo-code for the activities of the APs during handover movements in accordance with the present invention.
Figure 6B:
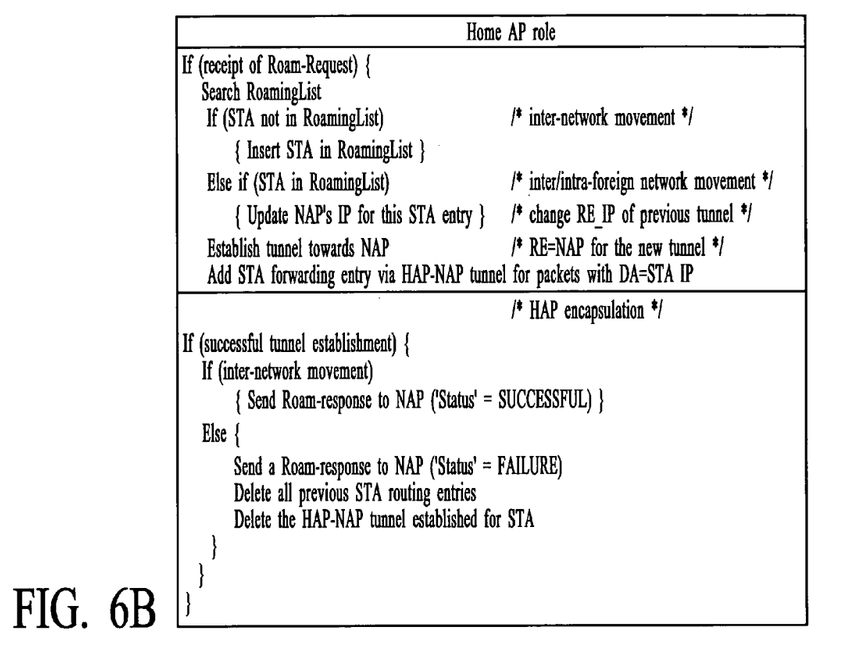
Figure 6C:
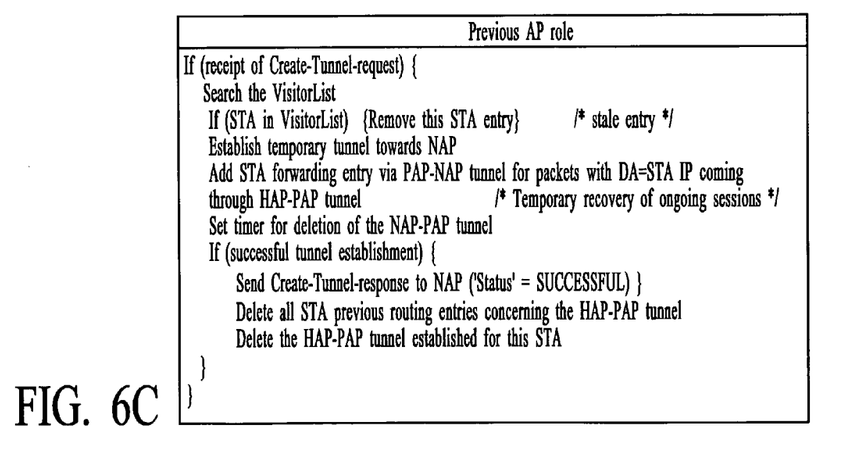

In addition to the packets and primitives, in accordance with the present invention, the management entity architecture of the AP is enhanced. Every AP acting as a HAP preserves a list (RoamingList) for its registered STAs that currently use a FACOA. Further, every AP serving as a FA preserves a list (VisitorList) with the currently connected STAs for which the FA has established tunnels toward the STA's HAP. For each AP involved in the L3 handover, it identifies its current role (NAP, HAP, or PAP) and performs the appropriate actions, as described hereinabove and presented in the pseudo-code of FIGS. 6a, 6b, and 6c.

The concept of IP tunneling is used in the present invention to provide the important functionalities at the involved APs of session re-establishment and routing of IP datagrams after handover completion. These are both achieved via IP encapsulation and decapsulation of the STA's IP datagrams by the APs.

Figure 7:
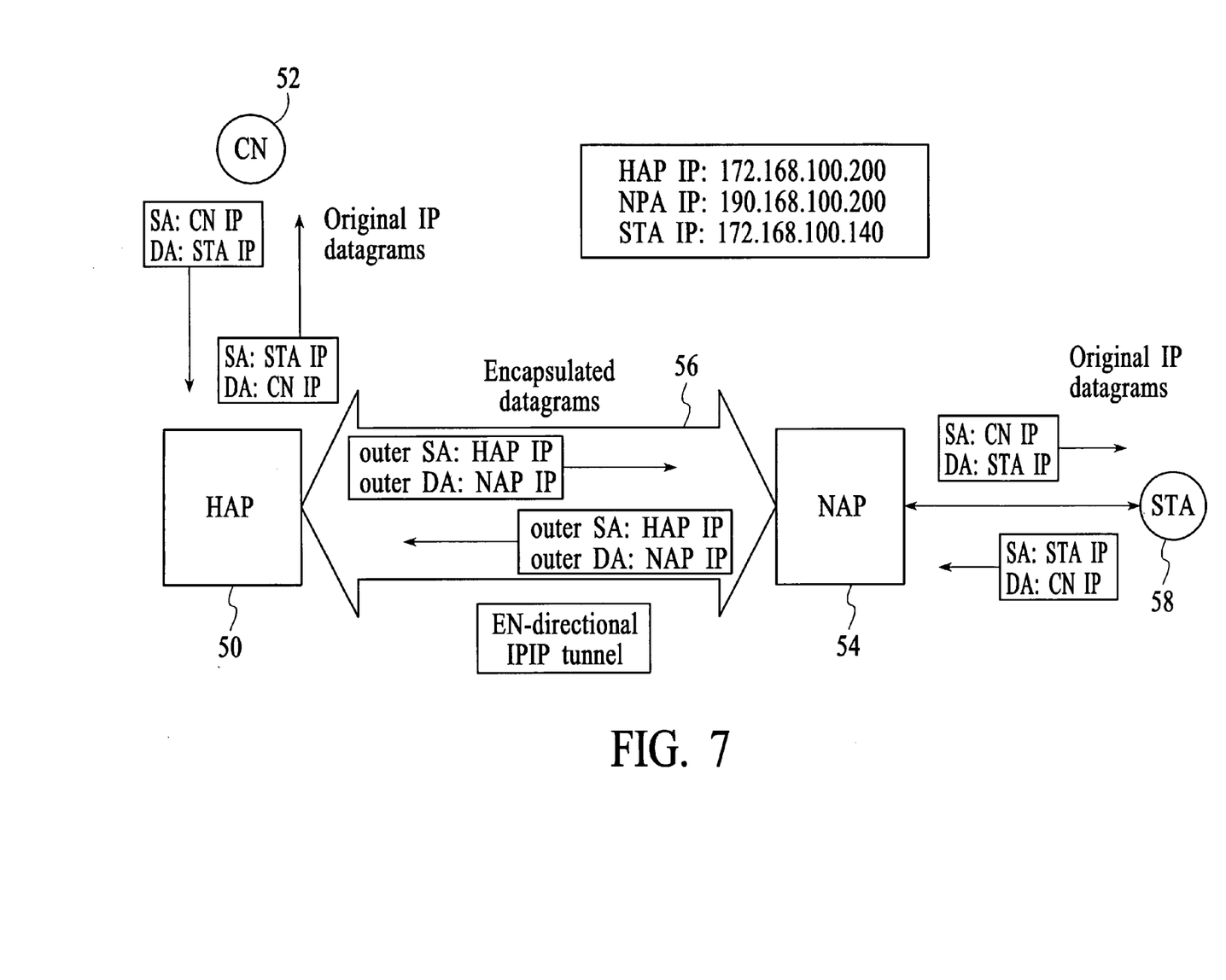
FIGS. 7 and 8 illustrate routing diagrams and datagrams in accordance with the present invention.

Referring to FIG. 7, for inter-network movement, in the forward direction (to the STA), the HAP 50 is able to route packets to the current location of the mobile terminal via IPIP encapsulation. The IP header of any packets in this direction has the IP address of the corresponding node (CN) 52 as a source address (SA) and the STA's 58 IP address as the destination address (DA). When the packet reaches the HAP 50, an additional IP header is added to the packet, as shown. The encapsulated datagram is forwarded to the NAP 54 through the existing HAP-NAP tunnel. The NAP 54 (FA) decapsulates/strips the outer IP header off of all packets destined to the STA's IP address and routes them to the directly connected STA 58 (ARP entry).

For inter-network movement in the backward direction (from the STA), the NAP 54 is able to route packets originated at the current location of the mobile terminal via IPIP encapsulation. The IP header of any packets sourced at the STA 58 includes a SA of STA IP and a DA of CN IP. When the NAP 54 has to route such packets, it does so using the HAP-NAP tunnel 56. The NAP 54 encapsulates the STA's packets by adding an outer header, as shown. The encapsulated datagram is forwarded to the HAP 50 through the existing HAP-NAP tunnel 56. There, the HAP 50 decapsulates/strips off the outer IP header of the packet and routes the initial packet to the original DA (which is the CN 52).

Figure 8:
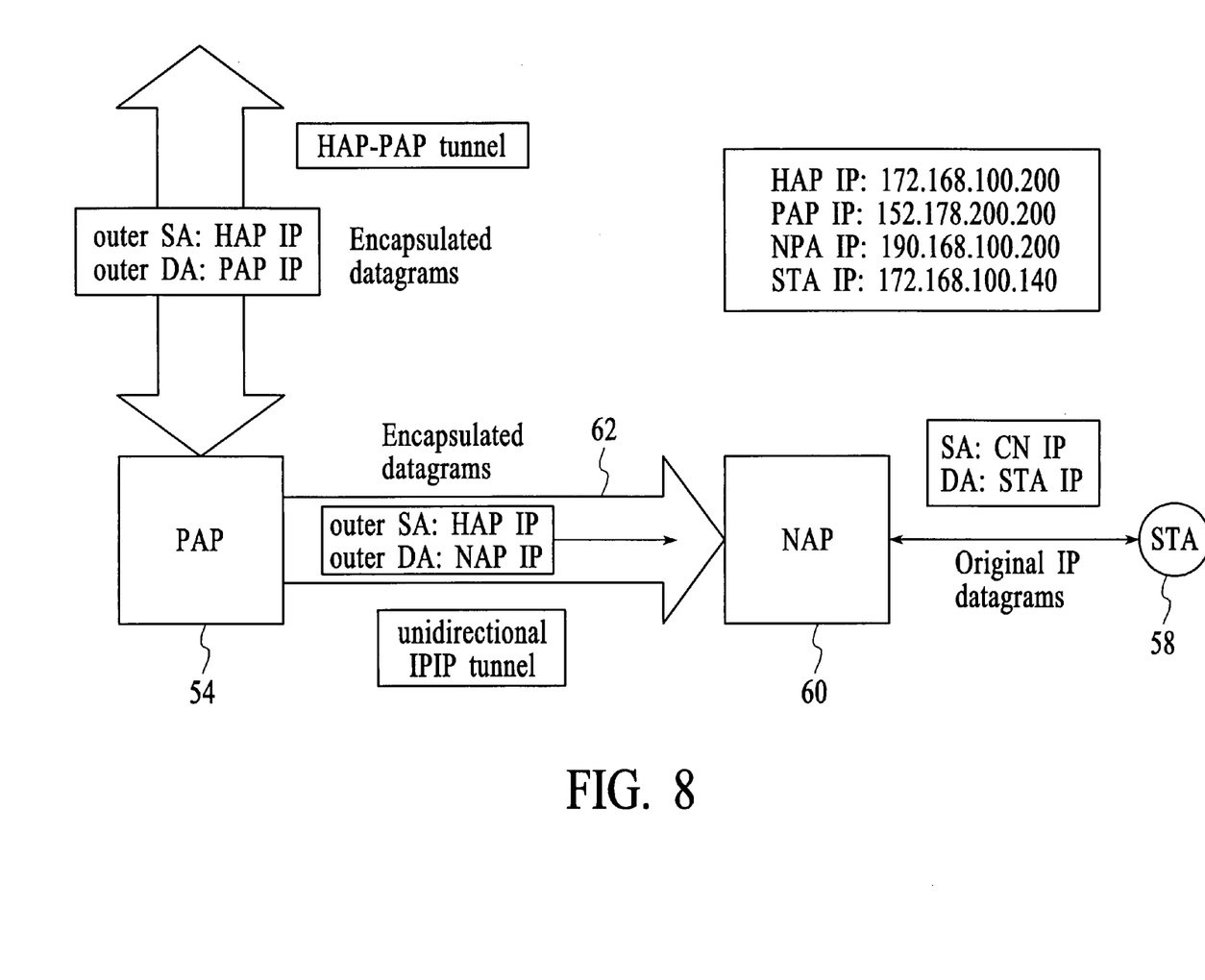

For inter/intra-foreign network movement, the STA 58 becomes associated to a new foreign AP (NAP 60, FIG. 8). The NAP 60 may belong to the same FN or another FN. After completion of the protocol of the present invention, a new bi-directional HAP-NAP tunnel is established, which serves the routing of the STA's IP datagrams, and the previous HAP-PAP tunnel is deleted after successful establishment of the new tunnel. Routing of the IP datagrams after handover completion is supported by the same routing methods presented with reference to FIG. 7. For fast and low-loss handoff purposes, a temporary PAP-NAP tunnel 62 is created before the HAP-PAP tunnel deletion. The session re-establishment is supported by the use of the NAP IP address as the STA's FACOA. Further, any packets that remained at the PAP after movement of the STA are forwarded to the STA's current AP, the NAP, through the temporary PAP-NAP tunnel. Upon receipt of these packets, the NAP routes them to the DA specified by the IP header of the packets, i.e., the STA IP address (existing STA ARP entry).

Thus, the present invention considers APs able to perform IP-in-IP encapsulation in order to utilize the IP tunneling and reverse tunneling methods. In this manner, a feasible and efficient way for supporting all forms of mobility of IEEE 802.11 mobile terminals is provided. Without such a mechanism, IP routing is not feasible in cases of L3 mobility within 802.11 environments.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method for seamless mobility of mobile terminals in a wireless network, the method comprising:
   (a) utilizing a reassociation request, from a mobile terminal to identify need for an internetwork handover of the mobile terminal roaming in a wireless local area network (WLAN); and
   (b) performing a protocol sequence in an access point (AP) for the mobile terminal to handle the internetwork handover to ensure connectivity of the mobile terminal while roaming,
   wherein the protocol sequence includes establishment of a temporary unidirectional IP tunnel from a previous AP of the mobile terminal to a new AP prior to deletion of a previously established IP tunnel between a home AP of the mobile terminal and the previous AP when the mobile terminal reassociates with a new AP in a foreign network.

2. The method of claim 1 wherein the step (a) of utilizing a reassociation request further comprises (a1) utilizing fields for internet protocol (IP) data in the reassociation request.

3. The method of claim 2 wherein the fields further comprise a home access point IP address, a mobile terminal IP address, and a previous access point IP address.

4. The method of claim 1 further comprising (c) performing a standard handover protocol sequence when no internetwork handover is identified.

5. A system for seamless mobility of mobile terminals in a wireless network, the system comprising:
   a plurality of Internet protocol (IP) networks; and
   a plurality of service sets within each IP network, the service sets supporting mobile terminals communicating wirelessly among the IP networks via access points (APs), the APs utilizing a reassociation request from a mobile terminal to identify need for an internetwork handover of the mobile terminal roaming wirelessly in the network and performing a protocol sequence for the mobile terminal to handle the internetwork handover to ensure connectivity of the mobile terminal while roaming,
   wherein when the mobile terminal reassociates with a new AP in a foreign network, a temporary unidirectional IP tunnel is established from a previous AP of the mobile terminal to the new AP prior to deletion of a previously established IP tunnel between a home AP of the mobile terminal and the previous AP.

6. The system of claim 5 wherein the new AP utilizes fields for IP data in the reassociation request to identify the internetwork handover.

7. The system of claim 6 wherein the fields further comprise a home access point IP address, a mobile terminal IP address, and a previous access point IP address.

8. The system of claim 5 wherein when the mobile terminal reassociates with a new AP in a non-foreign network, the new AP further performs a standard handover protocol sequence when no internetwork handover is identified.

9. The system of claim 5 wherein the protocol sequence further comprises:
   establishing a sequence of IP tunnels in the wireless network including the temporary unidirectional IP tunnel;

generating a set of primitives at the APs within the wireless network; and adding onto management entity architecture for the APs in an AP protocol stack.

10. A method for providing a protocol sequence to support seamless mobility of mobile terminals in a wireless network, the method comprising:

establishing a sequence of IP (Internet protocol) tunnels between access points (APs) in the wireless network;

generating a set of primitives at the APs within the wireless network; and adding onto management entity architecture for the APs in an AP protocol stack, wherein IAPP (Inter-Access Point Protocol) functionality is extended to maintain substantially constant IP-connectivity during handovers of the mobile terminal between the APs while roaming in the wireless network, wherein when a mobile terminal reassociates with a new AP in a foreign network, the method includes establishing a temporary unidirectional IP tunnel from a previous AP of the mobile terminal to the new AP prior to deletion of a previously established IP tunnel between a home AP of the mobile terminal and the previous AP.

11. The method of claim 10 wherein establishing a sequence of IP tunnels further comprises:

establishing one of the group comprising a bi-directional tunnel and two unidirectional tunnels from the home AP to the new AP; and removing the temporary unidirectional IP tunnel after establishment of an IP tunnel from the home IP and after the deletion of the IP tunnel between the home AP and the previous AP.

12. The method of claim 11 wherein generating a set of primitives further comprises generating a roam request primitive, a roam response primitive, a create-tunnel request primitive, and a create-tunnel response primitive for the temporary unidirectional IP tunnel.

13. The method of claim 12 wherein generating a set of primitives further comprises generating a set of corresponding packets that comprise TCP/IP packets of a roam request packet and a roam response packet, and UDP/IP packets of a create-tunnel request packet and a create-tunnel response packet.

14. The method of claim 13 further comprising:

generating the roam request primitive in the new AP in response to receipt of a reassociation indication in the case of a network handover of the mobile terminal; and triggering the sending of the roam request packet from the new AP to the home AP when the mobile terminal is associating to the new AP in a different network, including a foreign network and subnetwork, the roam request packet triggering creation of the bidirectional IP tunnel between the home AP and the new AP, the roam request packet comprising a packet format for an IAPP MOVE-notify with an addition of a field for the home AP IP address and a mobile terminal IP address.

15. The method of claim 14 further comprising:

generating the roam response primitive upon receipt of the roam request packet from the new AP; and triggering the sending of the roam response packet from the home AP to the new AP as a response to the roam request packet to indicate that the bi-directional tunnel is established, the roam response packet comprising a packet format for an IAPP MOVE-response with an addition of a field for the home AP IP address and a mobile terminal IP address.

16. The method of claim 13 further comprising:

generating a create-tunnel response primitive in the new AP when the mobile terminal moves within a foreign network or when the mobile terminal moves between foreign networks; and triggering the sending of a create-tunnel request packet from a new foreign AP to a previous foreign AP when the mobile terminal is moving from one foreign subnetwork or network to another, the create-tunnel request packet comprising a packet format for an IAPP MOVE-notify with an addition of a field for the new AP IP address and a mobile terminal IP address and indicating a new foreign care of address to the previous AP, the create-tunnel request packet triggering creation of the temporary unidirectional IP tunnel from the previous AP to the new AP to which the mobile terminal attaches.

17. The method of claim 16 further comprising:

generating a create-tunnel response primitive at the previous AP for the mobile terminal when the mobile terminal moves within or between foreign networks; and triggering the sending of a create-tunnel response packet from the previous AP to the new AP as a response to the create-tunnel request and indicating that the temporary unidirectional IP tunnel is established, the create-tunnel response packet comprising a packet format for an IAPP MOVE-response with an addition of a field for the new AP IP address and a mobile terminal IP address.

18. The method of claim 10 wherein adding onto management entity architecture for an AP in an AP protocol stack further comprises:

including an ordered list on every AP acting as a home AP of all associated mobile terminals that are currently moved into a network with a different IP domain; and including an ordered list on every AP acting as a foreign AP of all visiting mobile terminals for which a foreign AP has established IP tunnels toward the home AP of the visiting mobile terminal.

* * * * *

UNITED STATES PATENT AND TRADEMARK OFFICE
CERTIFICATE OF CORRECTION

| | |
|---|---|
| PATENT NO. | : 7,471,656 B2 |
| APPLICATION NO. | : 10/685727 |
| DATED | : December 30, 2008 |
| INVENTOR(S) | : Karoubalis et al. |

It is certified that error appears in the above-identified patent and that said Letters Patent is hereby corrected as shown below:

In column 2, lines 16-26, delete "Thus, via specific 802.11 MAC layer mechanisms, the STA 12a is now physically attached to a foreign AP 10c. However, it was not one of the IAPP objectives to provide support for inter-network (L3 or IP) handover of 802.11 roaming STAs. Accordingly, any packets now destined to the home address of the STA 12a are routed to its HN. However, these packets will be dropped due to the fact that the STA 12a does not physically belong there anymore. Similarly, any packets originated from the STA 12a will be dropped inside the foreign network, because their source IP address does not belong to this subnet." and
insert the same on Col. 2, Line 17 as a new paragraph.

Signed and Sealed this

Sixteenth Day of June, 2009

JOHN DOLL
*Acting Director of the United States Patent and Trademark Office*